United States Patent [19]
Warren et al.

[11] Patent Number: 5,855,129
[45] Date of Patent: Jan. 5, 1999

[54] LOCKING DEVICE

[75] Inventors: William Rick Warren; Ronald Wayne Warren, both of Castor; Randall T. Warren, Chestnut, all of La.

[73] Assignee: Warren Outdoor Products, Inc., Castor, La.

[21] Appl. No.: 890,275

[22] Filed: Jul. 9, 1997

[51] Int. Cl.[6] .................................................. B62H 5/00
[52] U.S. Cl. .................................................. 70/234; 70/58
[58] Field of Search .................................. 70/57, 58, 234, 70/38–41, 53

[56] References Cited

U.S. PATENT DOCUMENTS

| 585,917 | 7/1897 | Lang | 70/234 X |
|---|---|---|---|
| 3,739,609 | 6/1973 | Kaufmann | 70/234 |
| 3,918,279 | 11/1975 | Williamson | 70/234 |
| 3,944,079 | 3/1976 | Boslough | 70/234 X |
| 3,996,775 | 12/1976 | Waldron | 70/234 X |
| 4,126,228 | 11/1978 | Bala et al. | 70/234 X |
| 4,719,773 | 1/1988 | Alberts | 70/38 B X |
| 4,907,522 | 3/1990 | Lutzke | 70/58 X |
| 4,987,753 | 1/1991 | Kuo | 70/41 X |
| 5,094,423 | 3/1992 | Almquist et al. | 70/58 X |
| 5,199,282 | 4/1993 | Wang | 70/53 X |
| 5,501,086 | 3/1996 | Sherlock | 70/58 |
| 5,623,843 | 4/1997 | Sands | 70/234 |

FOREIGN PATENT DOCUMENTS

| 93/014955 | 8/1993 | WIPO | 70/58 |
|---|---|---|---|

*Primary Examiner*—Suzanne Dino Barrett
*Attorney, Agent, or Firm*—Roy, Kiesel & Tucker, PLC

[57] ABSTRACT

A device for locking movable objects, such as all terrain vehicles, in place. The device comprises an anchor member engageable with an embracing member where the embracing member embraces the object to be locked in place and engages the anchor member. The embracing member is locked with the anchor member with a lock. The anchor member can be inserted into the ground or fixedly attached to an immovable object thereby securing the invention in place.

24 Claims, 7 Drawing Sheets

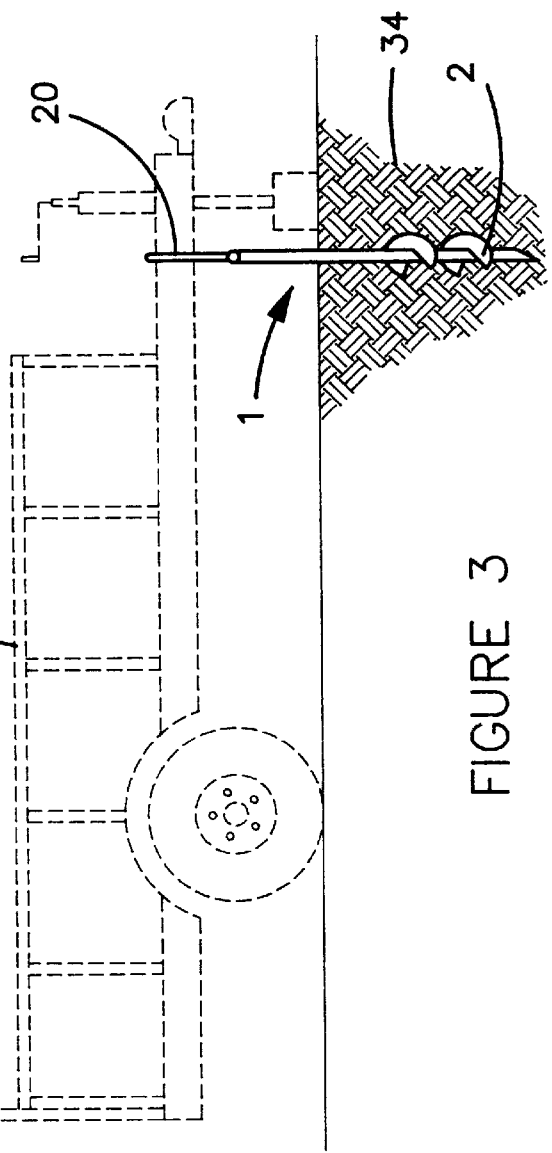
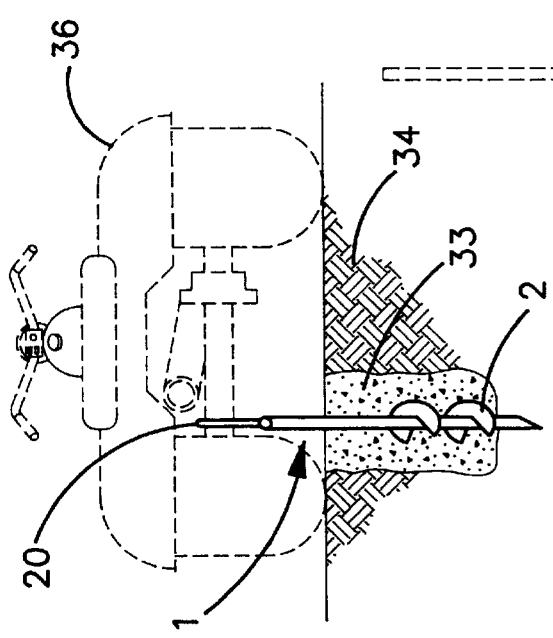
FIGURE 2
FIGURE 3

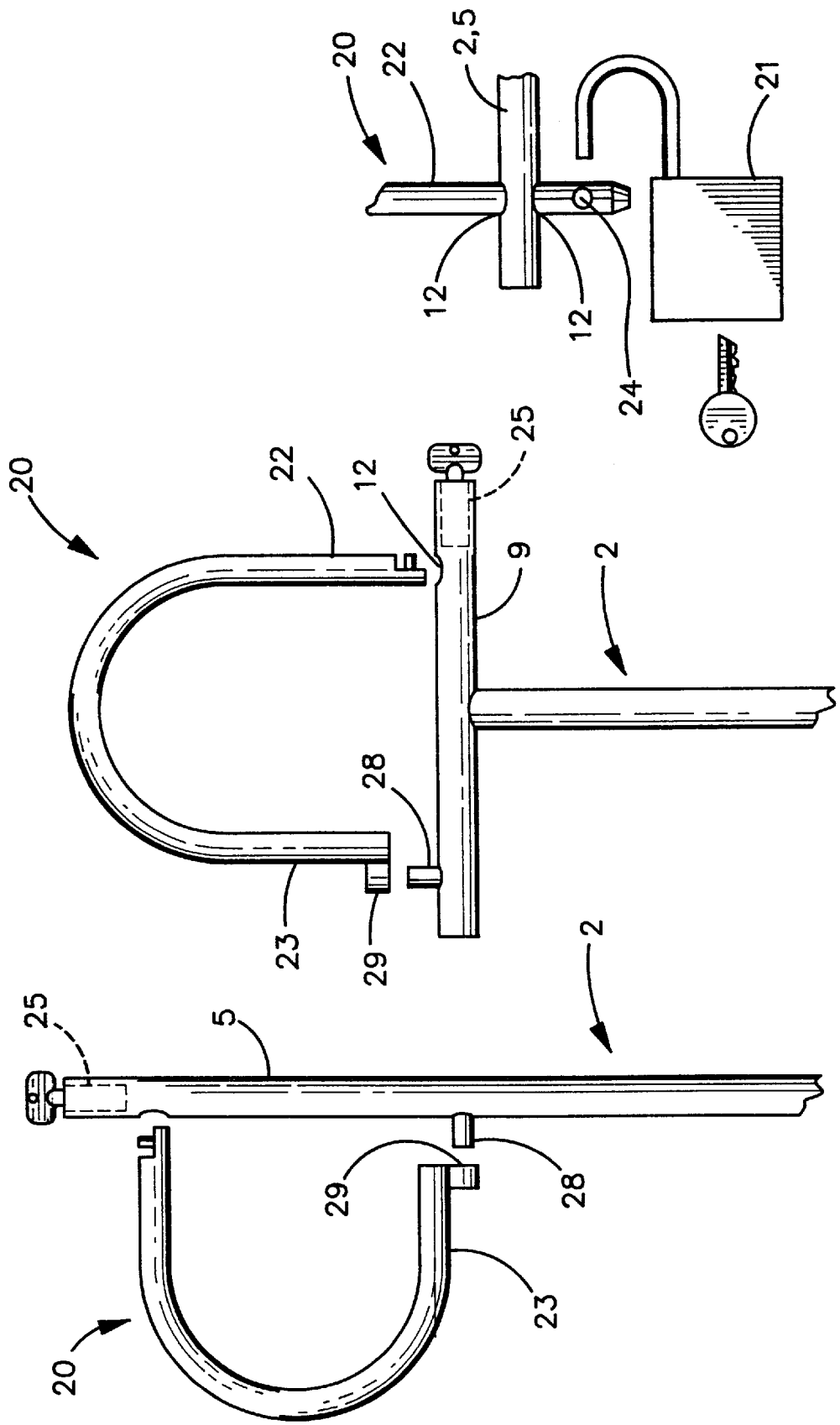

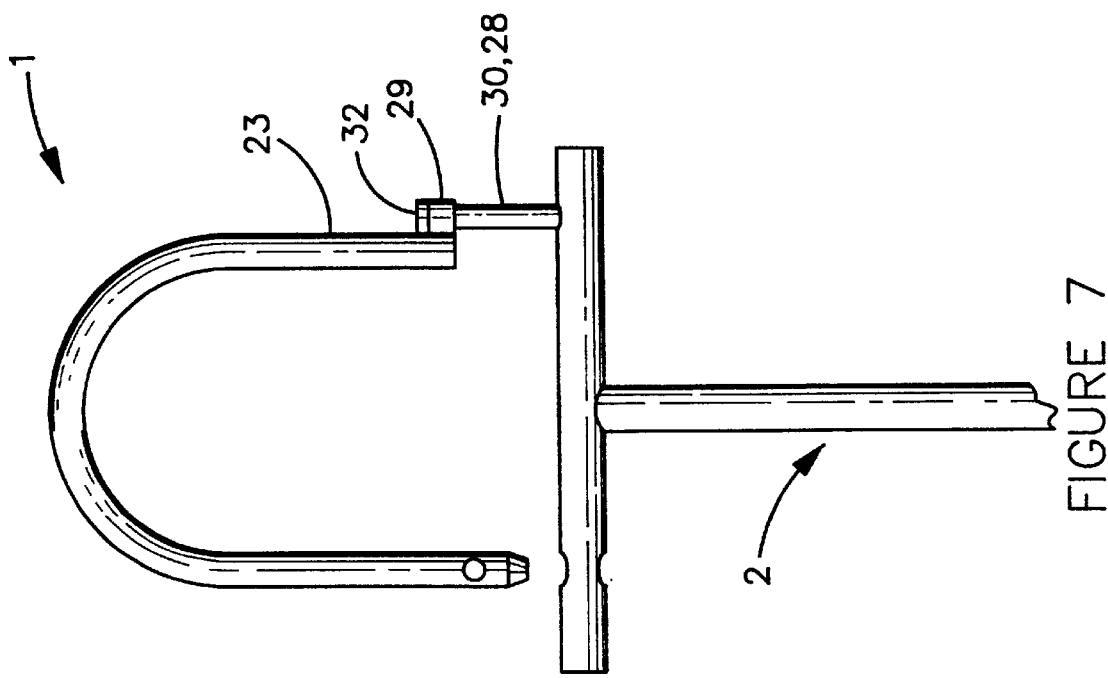
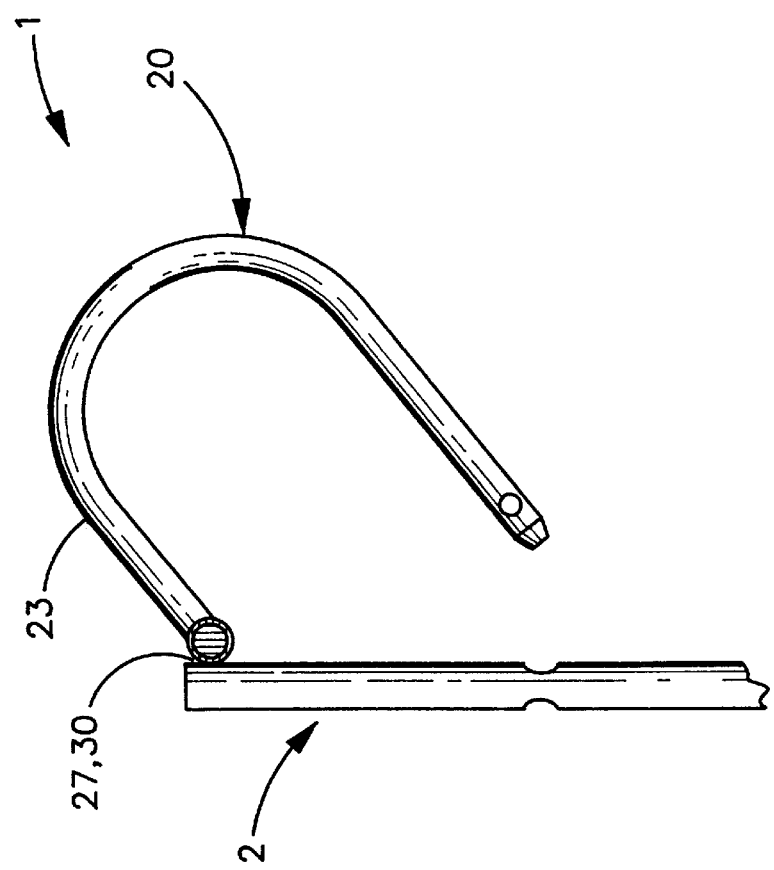

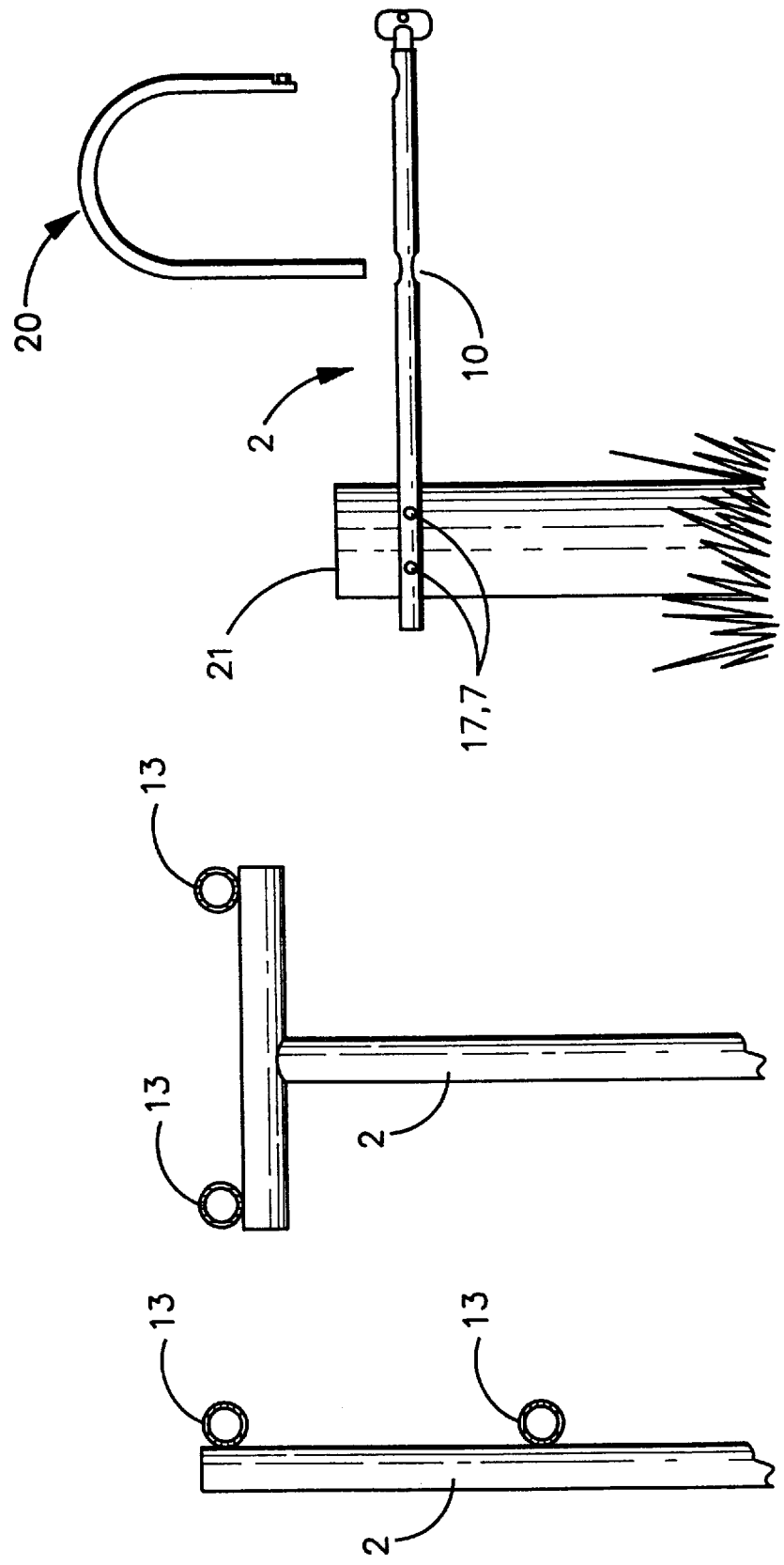

LOCKING DEVICE

BACKGROUND OF THE INVENTION

1. Field of the Invention

The invention relates to a device and method for locking objects in place. More specifically, the invention relates to a device and method for locking all terrain vehicles in place.

2. Prior Art

For owners of all terrain vehicles, as well as other types of small, mobile objects, a common problem is preventing theft of these objects. Generally, these movable objects are too large or too cumbersome to be placed in a garage or other protected area. Many owners simply leave these object in their yards, believing they will not be stolen. However, thieves often walk right in and steal the objects, and in the case of all terrain vehicles, the thieves just drive off with no trace. Obviously, efforts such as chaining the objects are not effective because thieves can simply cut the chains or pick the locks because of the easy access to the locking apparatus.

SUMMARY OF THE INVENTION

The locking device disclosed herein comprises an anchoring member engageable with an embracing member whereby a lock is used to lock the embracing member onto the anchor member. The anchoring member can be anchored in the ground or onto an immovable object by way of anchors attached to the anchoring member. When the embracing member has embraced an object and is locked onto the anchor member, the object is locked in place and cannot move except within the confines of the embracing member. It is preferred that the object to be locked in place cover the anchoring member, thereby restricting access to the lock. When the anchor member is securely anchored, the object is effectively locked in place until unlocked.

Therefore, it is an object of this invention to provide a device which enables one to lock an object, such as an all terrain vehicle in place, while at the same time hindering access to the lock, thereby deterring theft.

It is a further object of this invention to provide a mobile locking device that enables one to lock an object in place anywhere the invention can be anchored.

It is a further object of this invention to provide a locking device that is hard to break or cut, thus releasing the object or vehicle.

BRIEF DESCRIPTION OF THE DRAWINGS

FIG. 2 is a schematic depiction of a use of the invention where the invention is anchored in concrete and locks an all terrain vehicle in place.

FIG. 3 is a schematic depiction of a use of the invention where the invention is anchored into the ground and locks a trailer in place.

FIG. 5A is a detail of an alternative embodiment of the invention.

FIG. 5B is a detail of an alternative embodiment of the invention.

FIG. 5C is a depiction of an alternative locking means for the device.

FIG. 6 is a depiction of an alternative embodiment of the invention.

FIG. 7 is a detail prospective view of an alternative embodiment of the invention.

FIG. 9A is a detail of an alternative embodiment of the top of the anchor member.

FIG. 9B is a depiction of another alternative embodiment of the top of the anchor member.

FIG. 10 is a depiction of an alternative embodiment of the invention, where the anchor member is attached to an immoveable object.

DETAILED DESCRIPTION OF PREFERRED EMBODIMENTS OF THE INVENTION

Figure 1:
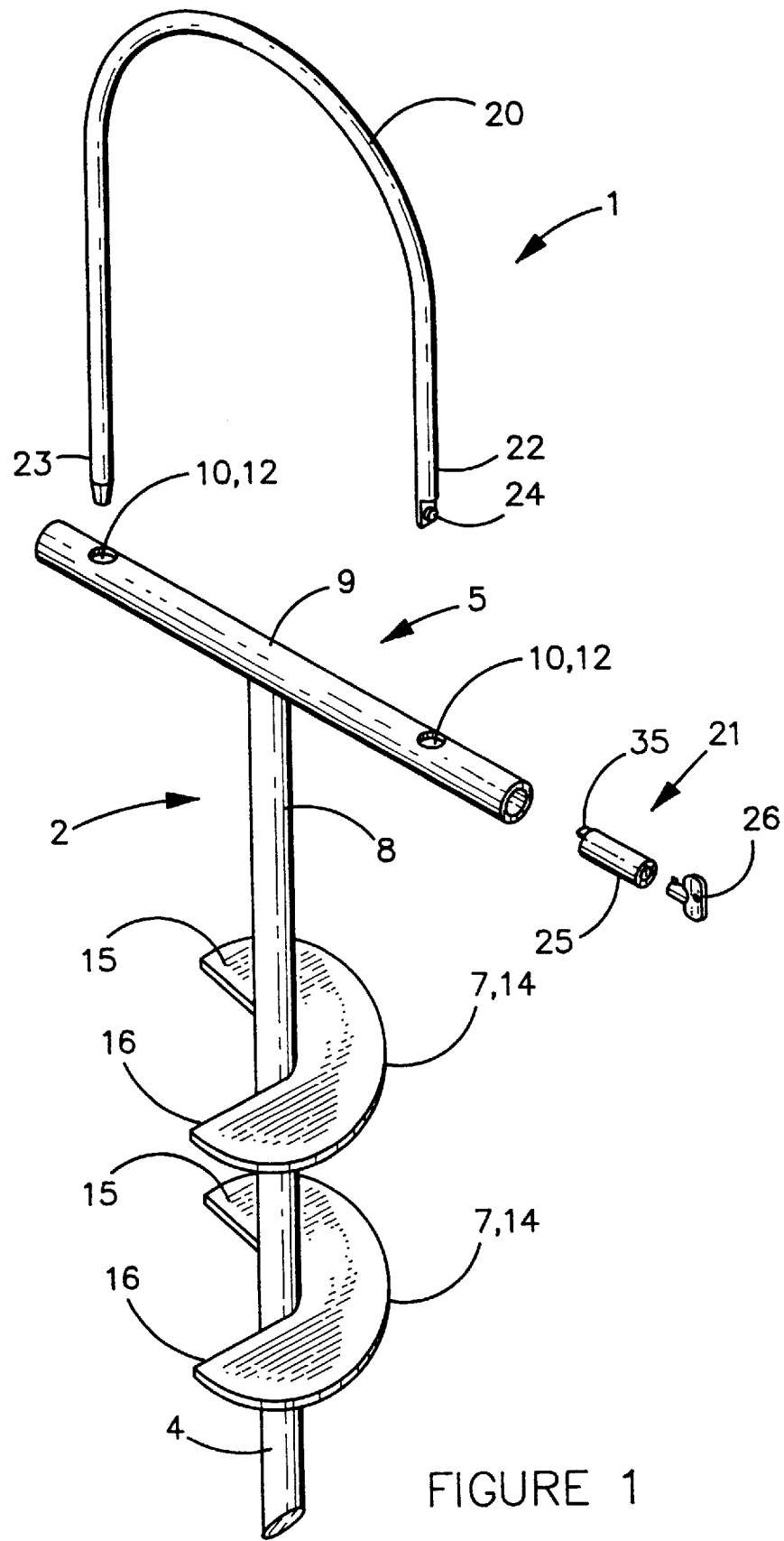
FIG. 1 is a schematic depiction of "T" shaped embodiment of the invention.

As shown in FIG. 1, a locking device 1 comprises an anchor member 2, and embracing member 20 and a lock 21. Embracing member 20 engages anchor member 2 and lock 21 secures embracing member 20 to anchor member 2.

Anchor member 2 has an anchoring end 4 and a lock end 5. Anchoring end 4 provides support for the invention and allows the invention to be immobilized in the ground or connected to another immovable object. As shown in FIG. 1, anchor(s) 7 are fixedly connected to anchor member 2 near anchoring end 4, although they may be placed elsewhere on anchor member 2 (not shown). Anchoring end 4 will be positioned below the ground when the invention is anchored into the ground. Anchor(s) 7 can be a ring member 14 angularly fitted around anchor member 2, having an outwardly facing upper edge 15 and lower edge 16, both of which can be tapered. Anchor(s) 7 help secure the invention by providing resistance to an upward force applied to anchored device, preventing removal of the invention from the ground. The tapered edges and angular orientation of the anchor(s) 7 around anchor member 2 act like an auger assisting the user in placing or removing the anchor member 2 into or from the ground. The angular orientation of the anchor(s) helps the device to screw into the ground to secure it and unscrew when it is removed. The tapered edges help cut through the ground as the invention is being inserted or removed from the ground, thus aiding the relative ease with which the device can be used.

As seen in FIG. 1, lock end 5 of anchor member 2 is T-shaped, having support member 8 and cross member 9. Support member 8 is fixedly connectable to cross member 9. As shown in FIG. 1, cross member 9 is welded to support member 8. Cross member 9, in one embodiment, may be hollow, allowing locking cylinder 25 to be inserted therein for engagement with embracing member 20, described later. A hollow cross member 9 also assists in placement or removal of anchoring member 8—embracing member 20 can be inserted inside hollow cross member 9 to help provide additional torque to anchor member 2 in the insertion or removal of anchor member 2 into or from the ground. Cross member 9, when hollow, has an inside diameter of sufficient size to allow embracing member 20 to be inserted into the hollow of cross member 9.

Cross member 9 has at least two lock end apertures 10 into which connection end 23 and lock end 22 of embracing member 20 may be positioned through. Lock end apertures 10 shown in FIG. 1 are connecting hole 11 and locking hole 12. As shown, locking hole 12 is a single hole in surface of cross member 9 leading into the hollowed center, thereby allowing that the area opposite of locking hole 12 in cross member 9 to act as a stop, preventing lock side 22 from passing completely through cross member 9. Connecting hole 11 is two aligned holes, each through the surface of hollow cross member 9, thereby allowing connection side 23 to pass completely through cross member 9. It is understood that connecting hole 11 and locking hole 12 are oriented in directions to allow engagement with embracing member 20. While lock end apertures 10 are shown as openings in the surface of cross member 9, other embodiments are possible, such as rings attached to cross member 9, into which embracing member may be positioned.

Although not shown, cross member 9 may be fixedly connectable with support member 8 by other means. For instance, cross member 9 may be connected with support member 8 using a screw or other connecting means to connect cross member 9 to support member 8.

Embracing member 20 is shaped to fit around the object to be locked in place and shaped to engage lock end apertures 10. As seen in FIG. 1, embracing member 20 is U-shaped and engageable with cross member 9 of lock end 5, more specifically, connecting hole 11 and locking hole 12 of cross member 9. Embracing member 20 has a connection side 23 and a lock side 22. Connection side 23 is long enough to slide completely through connecting hole 11 in cross member 9. The extra length of connection side 23 prevents easy disengagement of embracing member 20 when locking device 1 is locked.

Figure 4B:
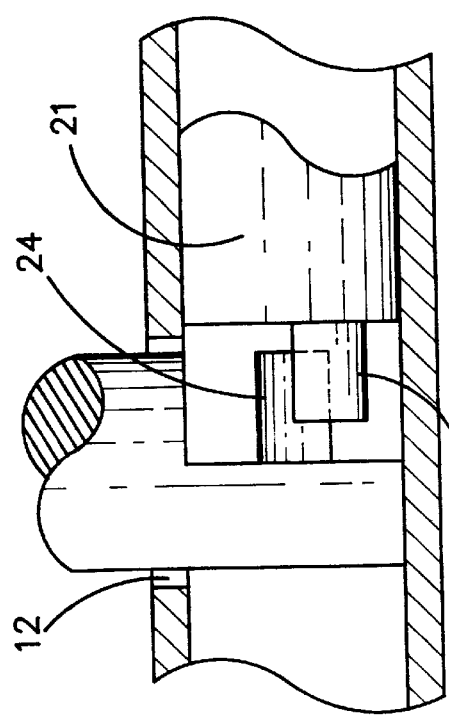
FIG. 4B is a detail of the locking mechanism unlocked.
Figure 4C:
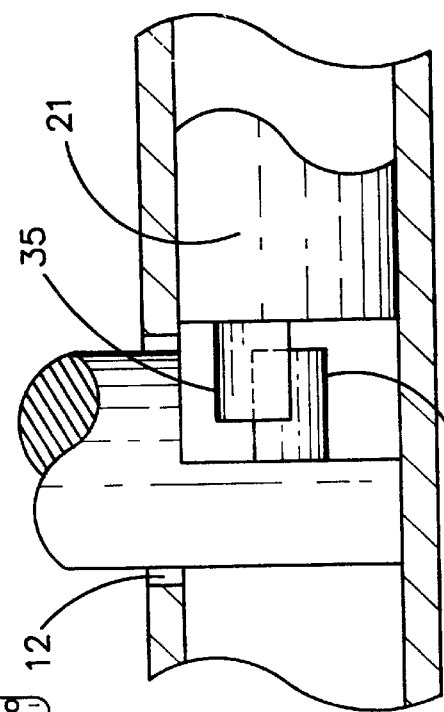
FIG. 4C is a detail of the locking mechanism locked.
Figure 4A:
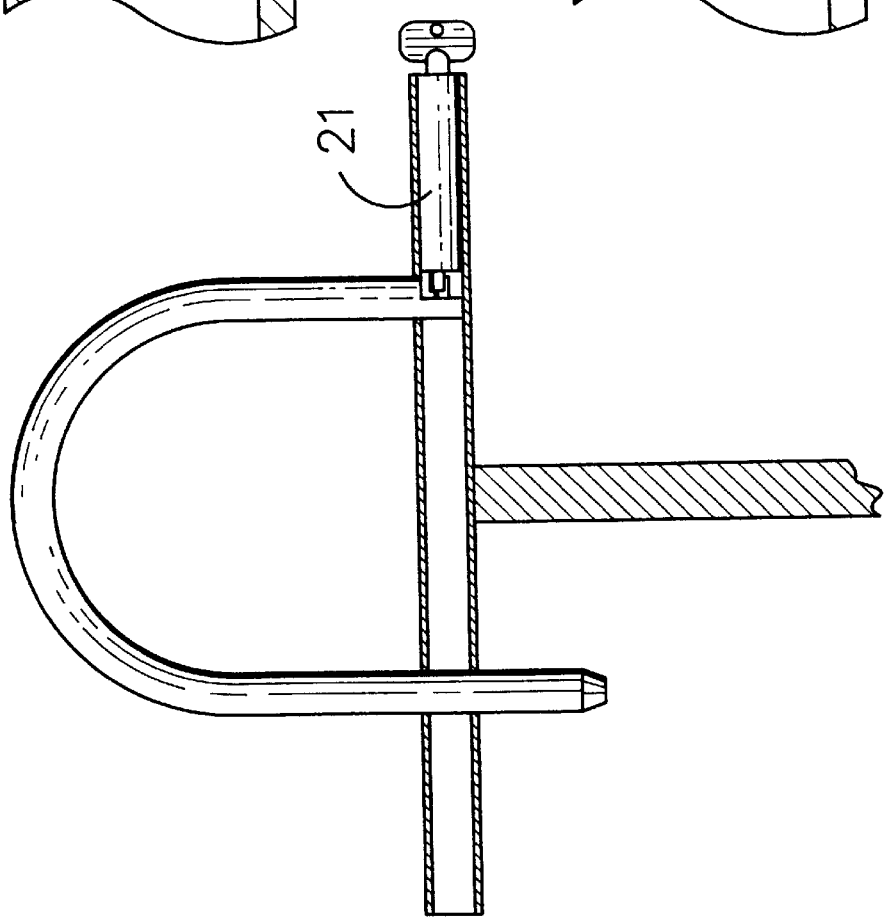
FIG. 4A is a detail of the locking mechanism of the device.

Lock side 22 is designed to slidingly engage lock hole 12. Lock side 22 has a lock receiver 24 engageable with lock 21. Lock receiver 24 is a notched area on the end of lock side with a raised button extending therefrom. Raised button and locking member 35 of locking cylinder 25 are positionable so as to lock embracing member 20 with cross member 9 or with anchor member 2. Locking member 35 is a arc shaped tab which extends outwardly from locking cylinder 25, and pivots in response to activation of locking cylinder 25 by key 26. As shown in FIG. 4, lock 21 is fixedly inserted in cross member 9. When locking cylinder 25 is in the open or unlocked position (FIG. 4B), locking member 35 lies below raised button, thus allowing insertion or removal of embracing member 20 with cross member 9. When locking cylinder is locked (FIG. 4B), tab rotates 180 degrees to place tab between raised button and aperture 10, thus preventing removal of embracing member 20 from anchor member 2.

FIG. 2 shows the invention anchored. As shown in FIG. 2, an object such as an all terrain vehicle 36, can be locked down with the aid of the invention. In FIG. 2, anchor member 2 is secured in concrete 33 placed into ground 34 of existing grade. Embracing member 8 is positioned around a portion of device to be secured, such as axle of all terrain vehicle 36, the vehicle positioned so that embracing member 20 can be locked with anchor member 2. When used in combination with concrete 33, anchor member 2 is permanently secured into the ground 34. As shown in FIG. 2, access to anchored device is restricted by the all terrain vehicle 36, making removal of the device difficult.

FIG. 3 shows one or more embodiments of the invention being used to lock a trailer 37 in place. As shown in FIG. 3, anchor member 2 is placed into ground 34 of existing grade. FIG. 3 shows how anchor(s) 7 help stabilize the invention and aid in its relatively easy use.

FIG. 5A shows an alternate locking configuration. In FIG. 5A, locking hole 12 passes completely through lock end 5 of anchor member 2. Lock side 22 of embracing member 20 is long enough to pass completely through locking hole 12 of cross member 9. Lock receiver 24 is a hole through lock side 22 of sufficient size to engage a lock 21. In this particular embodiment, lock 21 can be any lock, such as a pad lock or combination lock, that will slidingly engage and pass completely through lock receiver 24. Lock 21 is then locked, thereby acting as a stop when force is applied to disengage embracing member 20 from anchor member 2. It is understood that when this manner of locking is used, lock end 5 of anchor member 2 or cross member 9 need not be hollow. This locking manner can be used in any of the embodiments shown.

As seen in FIGS. 5B and 5C, anchor member 2 has a swivel post 28 attached in the upper midsection of anchor member 2. In this embodiment, connection side 23 has connection side ring 29 engageable with swivel post 28. When embracing member 20 is engaged with anchor member 2, connection side ring 29 engages swivel post 28. As seen in FIG. 5C, when anchor member 2 is T-shaped, swivel post 28 is then attached at either end of cross member 9, with locking hole 12 being placed at the opposite end of cross member 9. In any embodiment using the swivel post 28, it is preferred that swivel post 28 be long enough to prevent connection side ring 29 from disengaging swivel post 28 when the device is locked.

The embodiment shown in FIGS. 5B and 5C can be locked with several locking configurations. First, the locking cylinder and key disclosed earlier can be used whereby a locking cylinder 25 can be fixedly inserted into lock end 5 of anchor member 2 (FIG. 5B) or cross member 9 (FIG. 5C). Second, though not shown, lock hole 12 may extended through lock end 5 or cross member 9. Lock side 22 of embracing member 20 would then be designed to slide through lock hole 12. The locking method disclosed in FIG. 5A could then be employed to lock embracing member 20 with anchor member 2. Third, though not shown, swivel post 28 may be long enough to extend beyond connection side ring 29 when in place. Swivel post 28 may have a hole completely through swivel post 28, so that connection side ring 29 would rest between anchor member 2 and the hole in swivel post 28. Embracing member 20 would then be locked with anchor member 2 using a padlock or combination lock through hole in swivel post 28. The lock acts as a stop, preventing connection side ring 29 from disengaging swivel post 28. In this third locking manner, lock side 22 would slide all the way through lock hole 12 in lock end 5 or lock hole 12 in cross member 9.

FIG. 6 shows another embodiment of the invention. In this embodiment, connection side 23 is connectable with anchor member 2 by way of a connection part 30. As seen in FIG. 6A, connection part 30 is a hinge 27. Alternatively, as seen in FIG. 7, connection part 30 may comprise a swivel post 28 with a swivel post head 32 where embracing member 20 is connected to anchor member 2 via connection side ring 29. Swivel post 28 is of sufficient length to allow embracing member 20 to slide far enough from anchor member 2 to allow the object being locked to be removed from the locking device 1. Connection side ring 29 allows connection side 23 to slide along swivel post 28. Swivel post head 32 acts as a stop, preventing embracing member 20 from sliding off swivel post 28.

Figure 8:
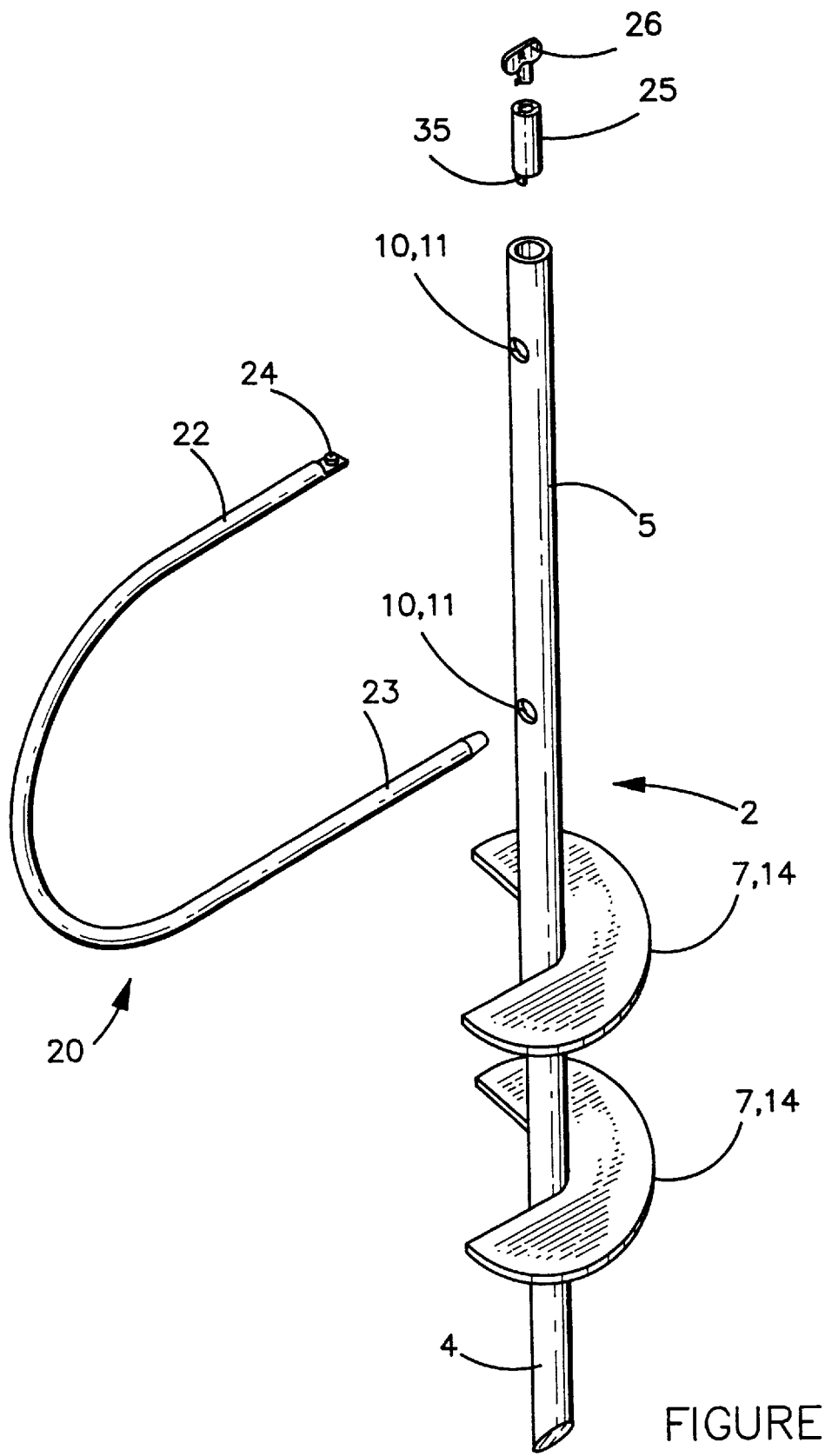
FIG. 8 is a detail prospective view of an alternative embodiment of the invention employing a straight shaft.

FIG. 8 shows an alternative embodiment wherein anchor member 2 is straight. When the locking method chosen is a locking cylinder 25, as shown in FIG. 8, locking hole 12 will be placed near lock end 5 to allow locking cylinder 25 to slidingly engage lock end 5. However, if the lock shown in FIG. 4 is used, the location of locking hole 12 and connection hole 11 are interchangeable as long as they are positioned to engage embracing member 20.

FIGS. 9a and 9b show embodiments where lock end rings 13 are attached to anchor member 2 to engage embracing member 20. Lock end ring 13 are hollow cylinders attached to anchor member 2 into which embracing member 20 may be positioned. In this embodiment, the locking method shown in FIG. 5A is preferred.

FIG. 10 shows an embodiment where anchor member 2 is straight. As seen in FIG. 10, anchor member 2 is aligned in a horizontal direction, but anchor member 2 may be aligned in any direction depending on the intended use. Lock end apertures 10 may be aligned in any direction depending on the use. Anchor member 2 has at least one anchor end aperture 17, which may comprise either at least one hole bored through anchor member 2 or at least one anchor end ring 18 (not shown); preferably, two or more anchor end apertures 17 will be employed to aid in securing anchor member 2 to immovable object 31. Anchor end apertures 17 are of sufficient size to allow an anchor 7 to slide through anchor member 2 and engage immovable object 31. Anchor 7 can be any object that will secure anchor member 2 to immovable object 31. Anchor 7 can include, but is not limited to, a screw, a nail or a nut and bolt combination. Alternatively, anchor member 2 may be poured in place, and hence not removable.

Though not shown, it is within the scope of this invention to use any combination of rings and apertures for engagement between embracing member 20 and anchor member 2 as well as for engagement between anchor member 2 and anchor 7 and anchor member 2 and immovable object 31.

We claim:

1. A locking device in combination with a wheeled vehicle, the combination comprising:
    a vehicle having at least one axle with wheels attached at the ends of said axle; and,
    a locking device engaged with said axle, said locking device having an anchor member, an embracing member, and a lock, said embracing member engagable with said anchor member, said lock engagable with said embracing member and said anchor member, and when so engaged, locking said anchor member to said embracing member about said axle, said vehicle substantially covering said locking device to restrict access to said locking device, said anchor member adapted to be removably anchored to an immovable object.

2. The device according to claim 1 wherein said anchor member has an anchoring end and a lock end, wherein said anchoring end has at least one anchor attached to said anchoring end.

3. The device according to claim 2 wherein said lock end is hollow.

4. The device according to claim 3 wherein said hollow lock end has an inner diameter, said inner diameter being sufficiently sized so that said embracing member can be slidably positioned therein.

5. The device according to claim 1 wherein said anchor member further comprises a support member connectable to a cross member, said cross member and said support member forming a "T" shape.

6. The device according to claim 5 wherein said cross member is hollow.

7. The device according to claim 6 wherein said hollow cross member has an inner diameter, said inner diameter being sufficiently sized so that said embracing member can be slidably positioned therein.

8. The device according to claim 2 wherein said lock end further comprises at least two lock end apertures, said lock end apertures engageable with said embracing member.

9. The device according to claim 8 wherein at least one of said lock end apertures comprise a lock end ring attached to said anchor member, said lock end ring engageable with said embracing member.

10. The device according to claim 2 wherein said anchor comprises a ring member angularly positioned on said anchor member, said ring member having at least one edge, said edge being tapered.

11. The device according to claim 2 wherein said anchoring end has at least one anchor end aperture.

12. The device according to claim 11 wherein said anchor end aperture comprises a hole through said anchor member.

13. The device according to claim 11 wherein said anchoring end further comprises at least one anchor end ring attached to said anchoring end of said anchor member.

14. The device according to claim 2 where said anchoring end has a pointed tip.

15. The device according to claim 1, wherein said embracing member is U-shaped, having a lock side and a connection side, said lock side adapted to engage a lock.

16. The device according to claim 15 where said connection side is of sufficient length to extend through a connection hole in said lock end of said anchor member.

17. The device according to claim 15 wherein said connection side is longer than said lock side.

18. The device according to claim 1, wherein said lock comprises a locking cylinder and a key.

19. The device according to claim 18, where said locking cylinder has a diameter such that said locking cylinder can be slidably inserted into said lock end of said anchor member, said locking cylinder having a locking member which engages said lock receiver.

20. The device according to claim 1 where the diameter of said embracing member is smaller than the inner diameter of said lock end of said anchoring member.

21. The device according to claim 1 where said embracing member is fixedly connected to said anchor member by a connection part.

22. The device according to claim 21 where said connection part comprises a hinge.

23. The device according to claim 21 where said connection part comprises a swivel post, swivel post head, and a connection side ring, said swivel post connected to said anchor member, said swivel post member fixedly attached to said swivel post opposite where said swivel post connects to said anchor member, said connection side ring engaged with said swivel post, said swivel post head preventing said connection side ring from disengaging said swivel post.

24. A method for locking a vehicle having a body and an axle having wheels attached to said axle and with a locking device comprising an anchor member, an embracing member, and a lock, said embracing member embracing said axle, said embracing member engagable with said anchor member, said lock engagable with said embracing member and said anchor member, and when so engaged, locking said anchor member to said embracing member, said anchor member adapted to be removably anchored to an immovable object, said method comprising the steps of:
    anchoring said anchor member;
    positioning said axle of said vehicle adjacent said anchor member;
    placing said embracing member around said axle;
    engaging said embracing member with said anchor member;
    engaging said lock with said embracing member and said anchor member; and,
    locking said lock
so that at least a portion of said vehicle body overlays said anchor member.

* * * * *